July 9, 1929.  P. D. STEAD  1,720,576

STABILIZING DEVICE FOR AIRCRAFT

Filed Aug. 2, 1928  2 Sheets-Sheet 2

WITNESSES
C. B. Shillinger

INVENTOR
P. D. Stead
BY
ATTORNEY

Patented July 9, 1929.

1,720,576

UNITED STATES PATENT OFFICE.

PHILIP D. STEAD, OF NORFOLK, VIRGINIA.

STABILIZING DEVICE FOR AIRCRAFT.

Application filed August 2, 1928. Serial No. 296,982.

This invention appertains to improvements in stabilizing devices for aircraft generally, and has for an object to provide for a type of such devices which will function to minimize or otherwise eliminate accidents resulting from nose-dives, tail-spins and the like of aeroplanes in flight.

Another object of the invention is to provide a device of the class set forth, which is extremely simple but durable and efficient in construction and arrangement of parts, comparatively inexpensive to manufacture and easy to install on standard types and makes of aircraft.

A further object of the invention is to provide a device as hereinbefore characterized, which, when properly installed in position on an aeroplane, will be entirely automatic in operation for its intended purposes, aforesaid.

Figure 1:
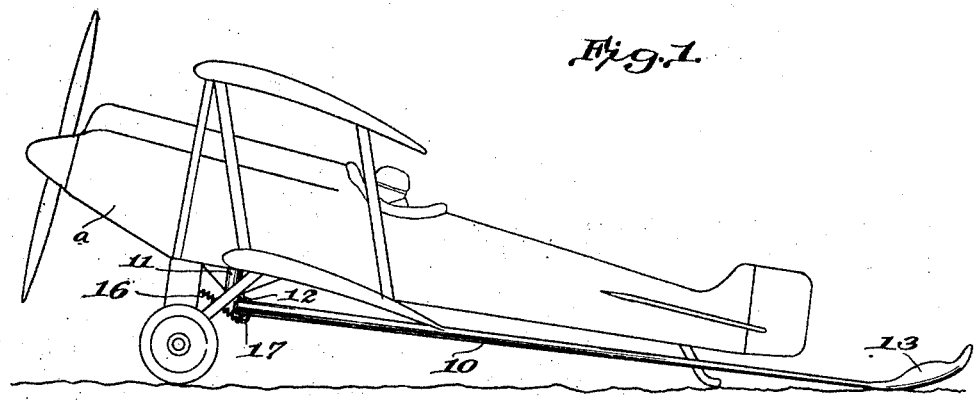
Figure 2:
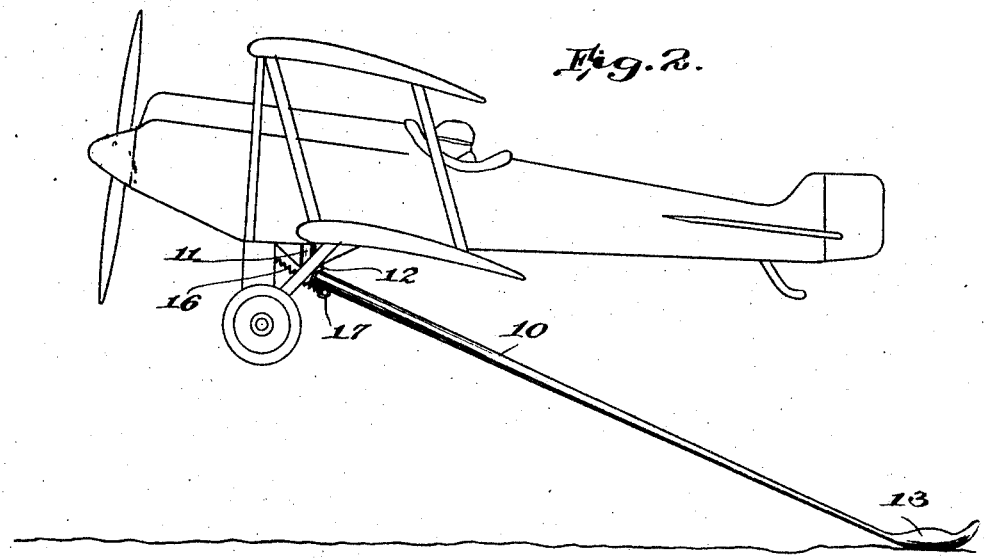
Figure 3:
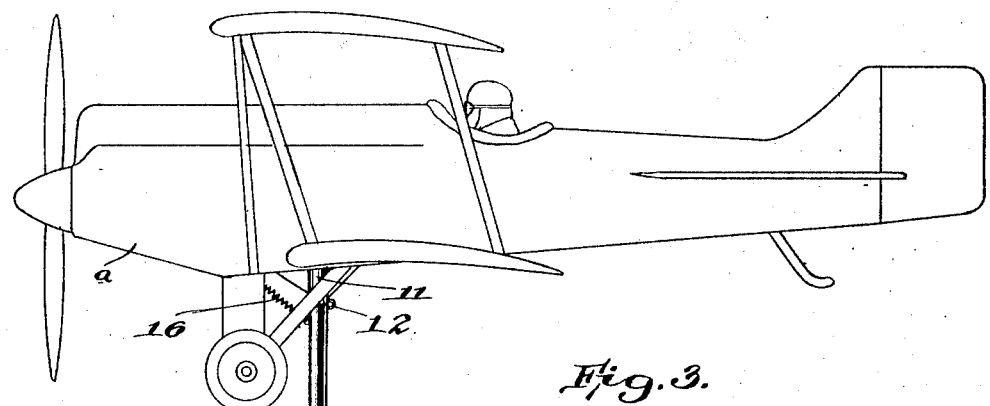
Figure 4:
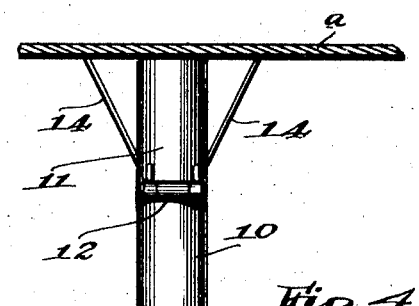
Figure 5:
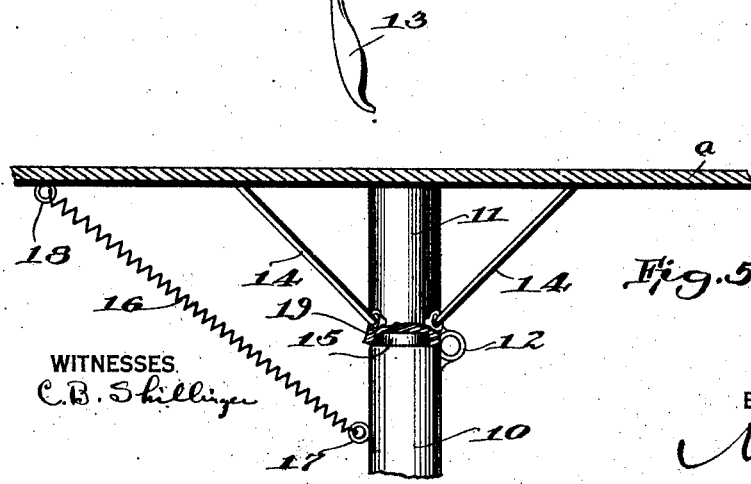

With the foregoing and other equally important objects and advantages in view, the invention resides in the certain new and useful combinations, construction and arrangement of parts as will be hereinafter more fully described, set forth in the appended claims, and illustrated in the accompanying drawings, in which:

Figure 1 is a side elevation of an aeroplane at rest, and showing the practical embodiment of the invention as applied thereto, Figure 2 is a similar view, but showing the aeroplane in a position at the moment of take-off, and the stabilizer in initial position of operation, Figure 3 is another similar view, showing the aeroplane in flight and the stabilizer disposed in the full position of operation, Figure 4 is an enlarged fragmentary section of the lower side of the fuselage of an aeroplane and showing the upper end portion of the stabilizing device in rear elevation and as attached thereto, and Figure 5 is a view similar to that of Figure 4, but showing the attached end portion of the device in side elevation and partly in section.

Referring to the drawings, wherein like characters of reference designate corresponding parts throughout the several views thereof, the embodiment of the invention, as shown therein by way of example, comprises an elongated member 10 dependingly supported from the underside of the fuselage $a$ of an aeroplane at the point of the center of balance thereof and through the medium of a supporting member or bracket 11 to the rear side of the lower end of which the member 10 is hinged, as at 12, for the purpose.

The elongated member 10 is preferably in the form of a flexible or semi-flexible length of rod or tubing and tapers towards its lower end where it merges into a substantially enlarged and preferably flat portion 13. This enlarged portion 13 is, however, preferably curved in a rearward direction, somewhat as shown, and it may be made solid to act of itself as a weight, or hollow, after the manner of a receptacle, to be weighted by the placing therein of articles of merchandise, mail matter or the like in sufficient amount.

The supporting member or bracket 11 is to be rigidly braced in its secured position at the under side of the fuselage $a$ by means of a number of members or rods 14, and has its lower end formed to provide a recess or socket to seat the upper reduced end portion 15 of the member 10 therein, when the latter is disposed in vertically alined relation therewith, in which position the member is sustained, when the aeroplane is in flight, by means of a coil spring or the like 16. This spring 16 has one end secured in an eye or the like 17 at the forward side of the member 10 at a point below the upper end thereof and its upper end in an eye or the like 18 secured in the lower side of the fuselage $a$ at a point in the plane of the longitudinal center of the latter and forwardly of the supporting member or bracket 11.

In the operation of the stabilizing device, as thus constructed and arranged, and with the aeroplane in position of take-off from the ground surface, the member 10 will extend rearwardly beneath the longitudinal center of the fuselage $a$, with its enlarged free end 13 resting on the ground. Now, as the aeroplane is set in motion for the take-off, the weighted end 13 of the member 10, will slide smoothly along the ground and thereby offer no impediment to the forward movement of the aeroplane. The part 13 continues in contact with the ground surface until the aeroplane rises in its take-off, and as it begins to rise, the spring 16 acts to draw the member 10 towards the vertical and, when the aeroplane has risen to a height where the part 13 is barely touching the ground or is entirely clear thereof, the spring 16 causes the latter to assume full vertical position with the reduced end portion 15 fully seated within the recess or socket in the lower end of the member of bracket 11. In this position, the member 10 forms a rigid T with the aeroplane in flight.

When the aeroplane comes to a landing position, the enlarged end 13 of the member 10 contacts the ground surface and bends in a rearward direction, causing the upper reduced end 15 thereof to disengage from the recess or socket in the member or bracket 11. During the continued landing flight of the aeroplane, the lower end of the member 10 trails along the ground surface and swings towards a horizontal position as the aeroplane comes to rest.

Thus, it is to be seen that the device, when sustained in the vertical position during flight of the aeroplane, acts to counter-balance any tendency of the aeroplane to nose-dive or tail-spin, and, also, in its application to commercial or other types of passenger carrying aeroplanes, it provides an effective means against stunt flying on the part of irresponsible aviators and otherwise reduces accidents to aeroplanes operated by the less experienced aviators to a minimum.

It is to be noted that the stabilizer will vary in size in proportion to the size of the aeroplane with which it is to be used, and the shorter the member 10, the greater should be the weight of the lower enlarged end thereof, and, conversely, the longer the member 10, the weight of the lower end 13 thereof should be decreased accordingly, also that the lower end of the supporting member or socket 11 will be flared slightly in a forward direction, as at 19, to give clearance to the upper end of the member 10 in the swinging movements thereof to seat and unseat the reduced portion 15 in and from the opening provided for its reception.

It is also to be noted, that in the case of engine trouble or stoppage, or the drop of an aeroplane in flight in an air pocket, it will be practically impossible for the aeroplane to side-slip, turn over or dive, so that it must volplane or parachute, as the case may be, to safety.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

What is claimed is:—

A stabilizing device for aeroplanes comprising a support secured at the lower side of the fuselage of an aeroplane at the center of balance thereof, an elongated rigid member hingedly connected at one end to said support for rearward swinging movements only from the vertical, means for automatically moving said member from a rearwardly directed position to the vertical during the take-off flight of the aeroplane, said support having a socket in its lower end to seat the upper end of said member therein when the latter is swung to vertically alined position therewith, and counter-balancing weight means carried at the other or lower end of said member.

PHILIP D. STEAD.